(12) United States Patent
Williams et al.

(10) Patent No.: US 6,957,269 B2
(45) Date of Patent: Oct. 18, 2005

(54) METHOD AND APPARATUS FOR PERFORMING PRIORITY-BASED FLOW CONTROL

(75) Inventors: Robert Williams, Cupertino, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 803 days.

(21) Appl. No.: 09/752,719

(22) Filed: Jan. 3, 2001

(65) Prior Publication Data

US 2002/0087723 A1 Jul. 4, 2002

(51) Int. Cl.$^7$ ............................ G06F 15/16; G01R 31/08
(52) U.S. Cl. ...................... 709/235; 709/240; 370/230; 370/235
(58) Field of Search ............................... 709/235, 240; 370/230, 235, 229, 232

(56) References Cited

U.S. PATENT DOCUMENTS

| | | | |
|---|---|---|---|
| 6,035,333 A | 3/2000 | Jeffries et al. | 709/224 |
| 6,170,022 B1 | 1/2001 | Linville et al. | 710/29 |
| 6,181,699 B1 * | 1/2001 | Crinion et al. | 370/392 |
| 6,212,582 B1 * | 4/2001 | Chong et al. | 709/234 |
| 6,628,613 B1 | 9/2003 | Joung et al. | 370/230 |
| 6,667,985 B1 * | 12/2003 | Drummond-Murray | 370/235.1 |
| 6,721,273 B1 * | 4/2004 | Lyon | 370/235 |

OTHER PUBLICATIONS

Aydemir et al., "Flow Control in Gbs Ethernet Networks", Nov. 11, 1998, IBM.*

Bunch, Bill, An Introduction to Auto-Negotiation, Feb. 1995, http://www.scyld.com/NWay.html.*

U.S. Appl. No. 09/877,122, filed Jun. 11, 2001.

W. Noureddine et al.; Selective Back-Pressure in Switched Ethernet Lans; Global Telecommunications Conference; Globecom 1999; pp. 1256-1263.

Rich Seifert; RE: Priority Service and 802.3 Flow Control; Internet Discussion Board; Jun. 21, 1996; 1 page.

Ariel Hendel; RE: Priority Service and 802.3 Flow Control; Internet Discussion Board; Jun. 21, 1996; 1 page.

J.K. Roussos et al.; Congestion Control Protocols for Interconnected Lans Supporting Voice and Data Traffic; Computer Communications; vol. 17, No. 1; Jan. 1994; pp. 25-34.

Rich Seifert; The Switch Book; John Wiley & Sons, Inc.; 2000; pp. 520-544.

* cited by examiner

Primary Examiner—Jeffrey Pwu
(74) Attorney, Agent, or Firm—Harrity & Snyder LLP

(57) ABSTRACT

A network device that controls the communication of data frames between stations receives data frames having different levels of priority. The network device identifies the levels of priority and processes the frames based on the priority level. When a congestion condition associated with a resource on the network device occurs, the network device generates a pause frame that includes a priority indicator and transmits the pause frame to at least one station. When a receiving station receives the pause frame, the receiving station suspends transmission of data frames having a priority corresponding to the priority indicator and continues transmitting frames having other priorities.

22 Claims, 6 Drawing Sheets

| DA | SA | LENGTH/ TYPE | OPCODE | PARAMETERS | PAD | FCS |

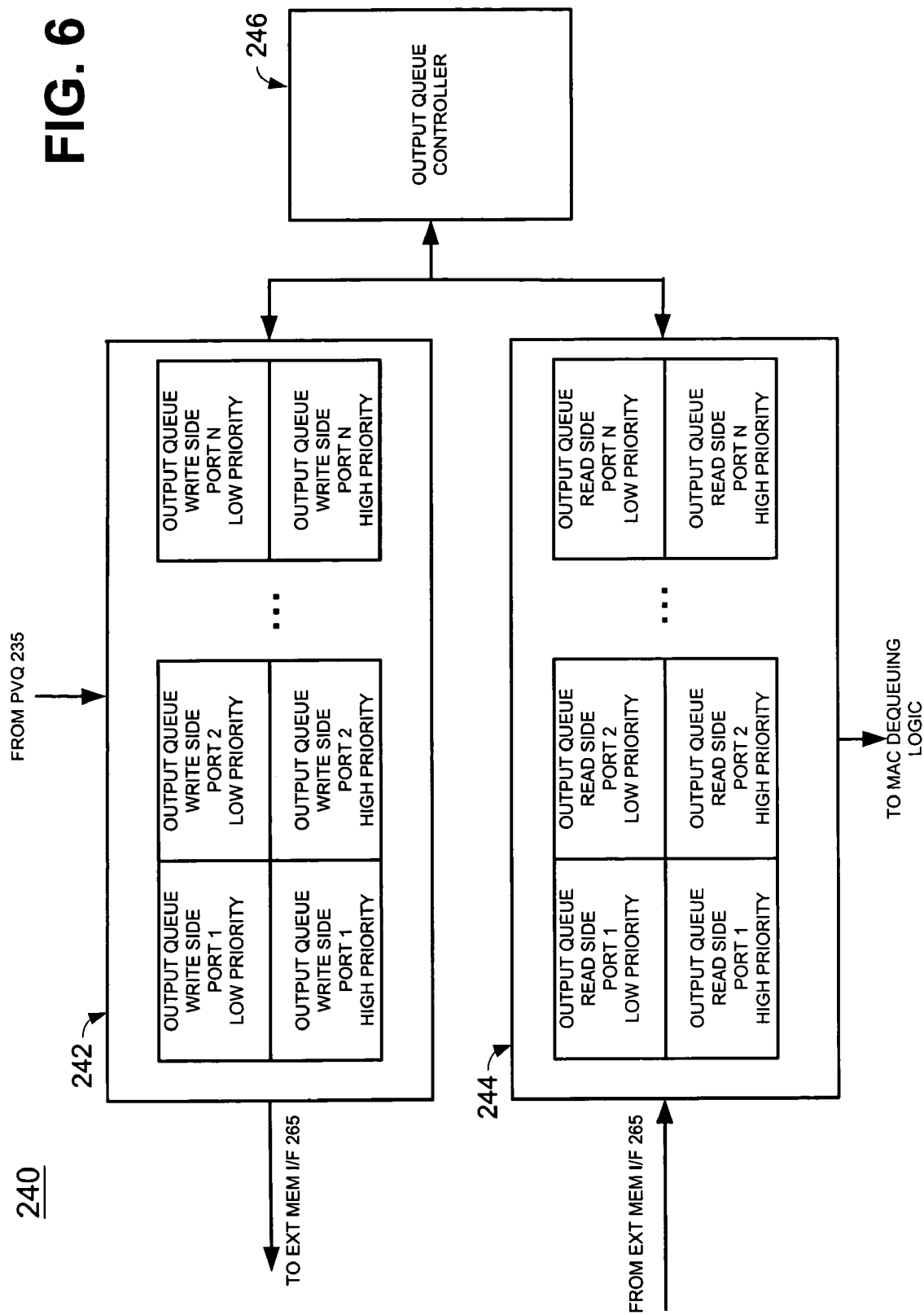

METHOD AND APPARATUS FOR PERFORMING PRIORITY-BASED FLOW CONTROL

TECHNICAL FIELD

The present invention relates generally to network communications and, more particularly, to traffic flow control in a network switch.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches implement a flow control scheme using "pause" frames. For example, when some sort of congestion on the switch occurs, the switch may transmit a media access control (MAC) control pause frame to one of the stations connected to the switch. The pause frame instructs that station to stop sending data for a period of time.

A drawback with conventional flow control schemes, such as those using pause frames, is that the station receiving the pause frame suspends all data transmissions for a period of time defined in the pause frame. The congestion on the switch, however, may be associated with only a certain type of data frame. For example, the congestion may be associated with low priority frames. In this case, requiring a station to suspend all data transmissions reduces data throughput more than is required based on the type of congestion.

DISCLOSURE OF THE INVENTION

There exists a need for mechanisms for suspending data transmissions based on an identified type of congestion. There is also a need for a method of increasing network throughput by selectively pausing data transmissions based on an identified type of congestion.

These and other needs are met by the present invention, where a multiport switch identifies a type of congestion associated with a resource on the multiport switch. The multiport switch transmits a communication to one or more stations requesting suspension of data transmissions associated with the identified type of congestion. The receiving station then suspends data transmissions of the identified type, but continues transmitting data of other types.

According to one aspect of the present invention, a network device controls communication of data frames between stations. The network device includes a logic device configured to detect a condition associated with a resource on the network device. The network device also includes a frame generating device configured to generate a pause frame requesting suspension of data traffic in response to the detection of the condition, where the pause frame includes a priority indicator. The network device further includes a transmit device configured to transmit the pause frame to at least one station.

Another aspect of the present invention provides a computer-readable medium having a data structure. The data structure includes a source address field and a destination address field. The data structure also includes a priority field including information representing a priority level associated with data frames. The data structure further includes a pause time field including information representing a length of time for at least one receiving station identified by the destination address field to suspend data transmissions relating to the priority level in the priority field.

A further aspect of the present invention provides a first network device in a network that includes a number of network stations and at least one network device configured to control communication of data frames between stations. The first network device includes a receive device configured to receive data frames from at least one of the network stations and other network devices. The first network device also includes data frame processing logic configured to identify a received data frame as a pause frame, where the pause frame includes a priority indicator, and map the priority indicator to a first priority. The data frame processing logic is also configured to suspend transmission of data frames corresponding to the first priority, and continue transmission of data frames corresponding to priorities other than the first priority.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

FIG. 3 is a block diagram of a conventional pause frame.

FIG. 6 is a block diagram illustrating the output control queues of FIG. 2, according to an exemplary implementation of the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
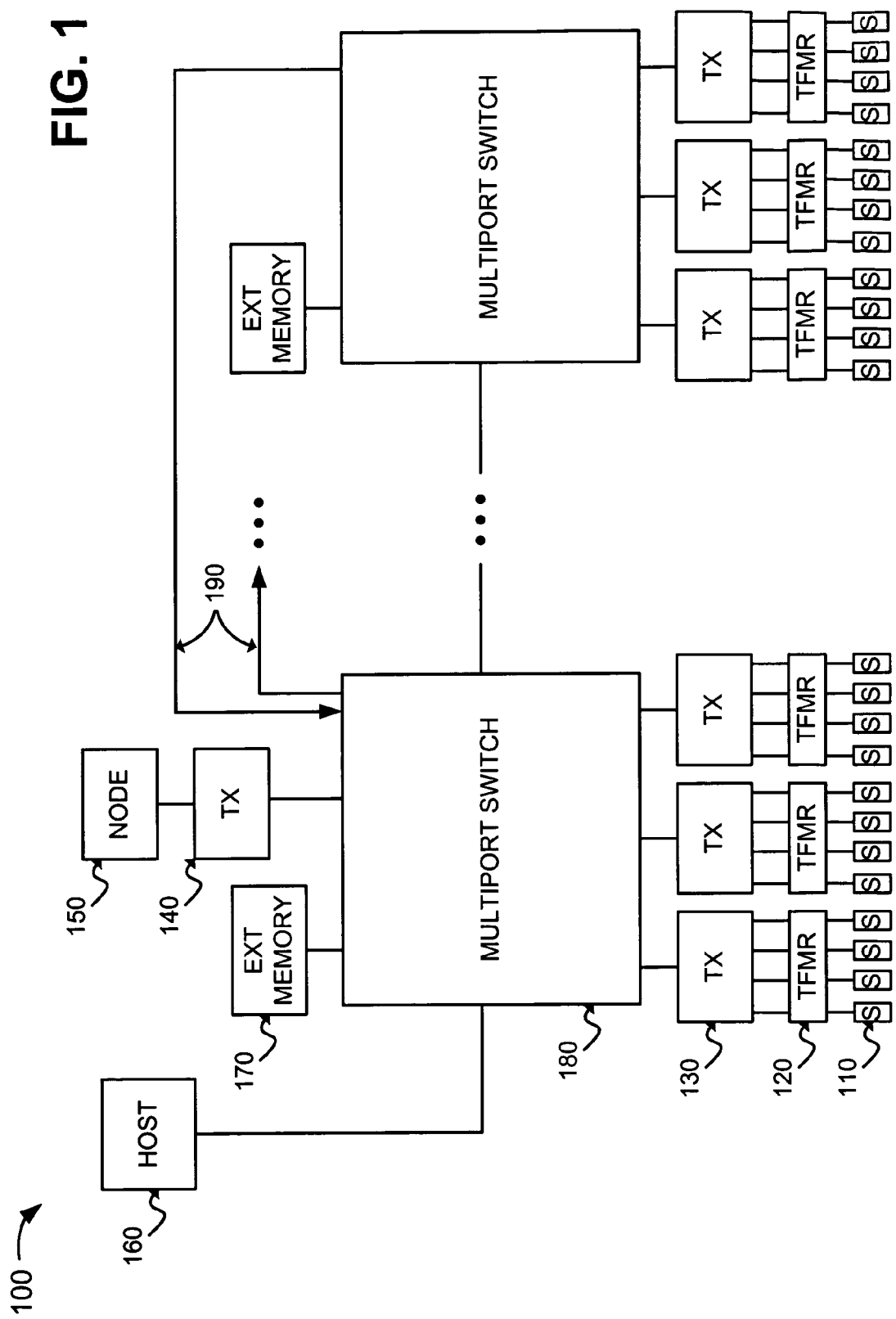
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
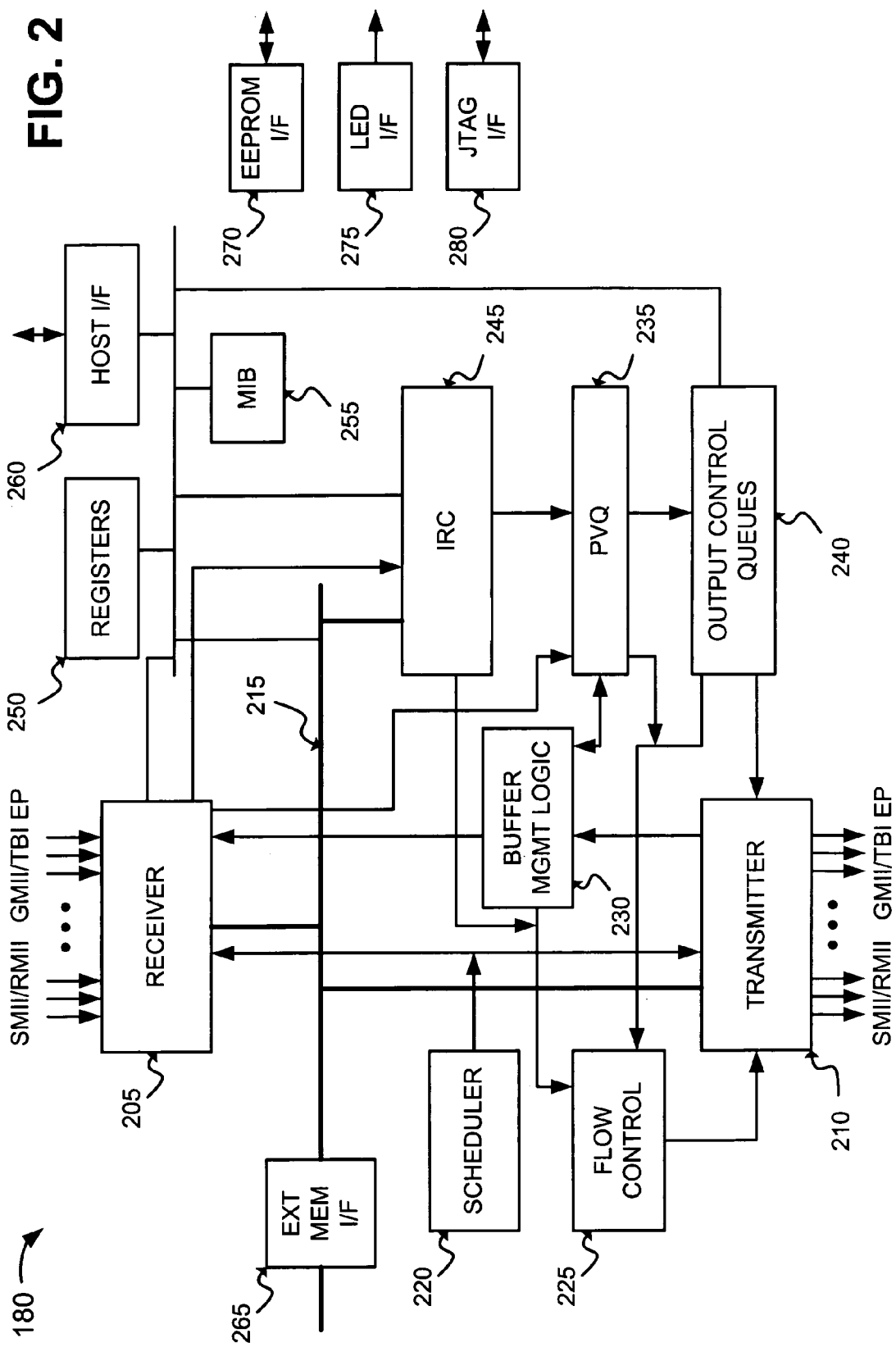
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Priority Based Flow Control

The present invention is directed to a priority-based flow control mechanism in a network switch, such as multiport switch 180. The present invention modifies a conventional MAC control pause frame to include a priority-related field. The multiport switch 180 switch identifies the type of congestion on the switch and transmits a MAC control pause frame identifying that type of congestion. The receiving device receives the MAC control pause frame, identifies the type of data from the priority field and suspends transmission of that type of data traffic.

FIG. 3 illustrates a conventional MAC control pause frame 300 in accordance with IEEE 802.3. The MAC control pause frame 300 may be transmitted to stations that are configured for full-duplex operations. Referring to FIG. 3, the MAC control pause frame 300 includes the following fields: destination address (DA), source address (SA), length/type, opcode, parameters, pad and frame check sequence (FCS). It should be understood that preamble and start-of-frame delimiter (SFD) information may also be transmitted with MAC control pause frame 300.

The destination address field is six bytes in length and may be set to the address of the station(s) from which a switch wishes to suspend data transmissions. This address may be a multicast address that identifies multiple stations from which the switch wishes to suspend data transmissions. The SA field is also six bytes in length and may be set to the address of the station sending the MAC control pause frame 300. In the situation in which the switch transmits the MAC control pause frame 300, the SA may be set to the address assigned to the switch.

The length/type field is two bytes in length and identifies frame 300 as a MAC control frame. According to conventional methodology, this field may be set to the value 8808 (hexadecimal). The opcode field is two bytes and identifies the MAC control frame as a pause frame. According to conventional methodology, the opcode may be set to the value 0001 (hex). The parameters field is two bytes and includes a pause time parameter. The pause time parameter defines the length of time that the receiving station is requested to suspend data transmissions. The pause time may be measured in units of pause quanta, with each unit equal to 512 bit times. If a station(s) transmits a pause frame with the pause time set to 1000 (decimal), the receiving station(s) should inhibit transmission of frames for (1000) (512) or 512,000 bit times. A bit time is equal to 100 nanoseconds (ns) for 10 Mb Ethernet, 10 ns for 100 Mb Ethernet and 1 ns for 1 Gb Ethernet.

The pad field is used when the parameters field does not fill the fixed length of a MAC control frame. The pad field is transmitted with zeros and its size is determined by the size of the parameters field and the minimum frame size. The FCS field is four bytes in length and includes a cyclic redundancy check (CRC) code appended to the MAC control pause frame 300.

The present invention advantageously modifies the standard MAC control pause frame 300 to include priority-related information, as described in more detail below. According to the present invention, if a resource associated with data frames of a certain priority becomes congested, the multiport switch 180 may send a control pause frame to request suspension of data traffic of that particular priority, without affecting traffic of other priorities. In this manner, the priority field may be used to advantageously enable the present invention to selectively suspend data transmissions.

Figure 4:
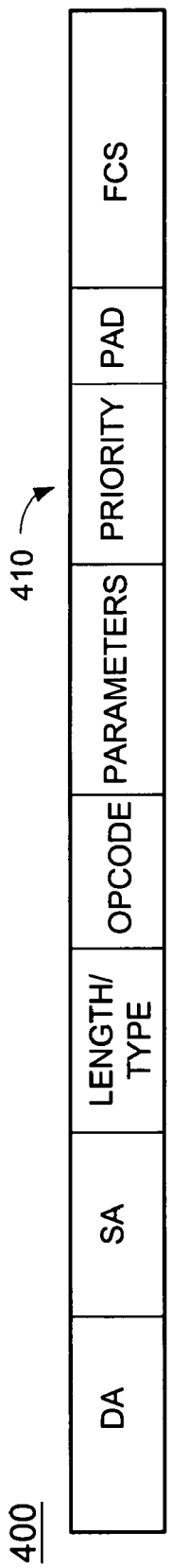
FIG. 4 is an exemplary diagram of a pause frame, consistent with an implementation of the present invention.

FIG. 4 illustrates an exemplary MAC control pause frame 400 consistent with an embodiment of the present invention. Referring to FIG. 4, the MAC control pause frame 400 includes DA, SA, length/type, opcode, parameters, pad and FCS fields, as used in conventional MAC control pause frame 300. Preamble and SFD information may also be transmitted with MAC control pause frame 400. The MAC control pause frame 400 also includes a priority field 410. The priority field 410 may be used to indicate a type of frame that is causing the congestion problems. For example, the priority field 410 may indicate that the multiport switch 180 has congestion affecting a low priority resource.

Figure 5:
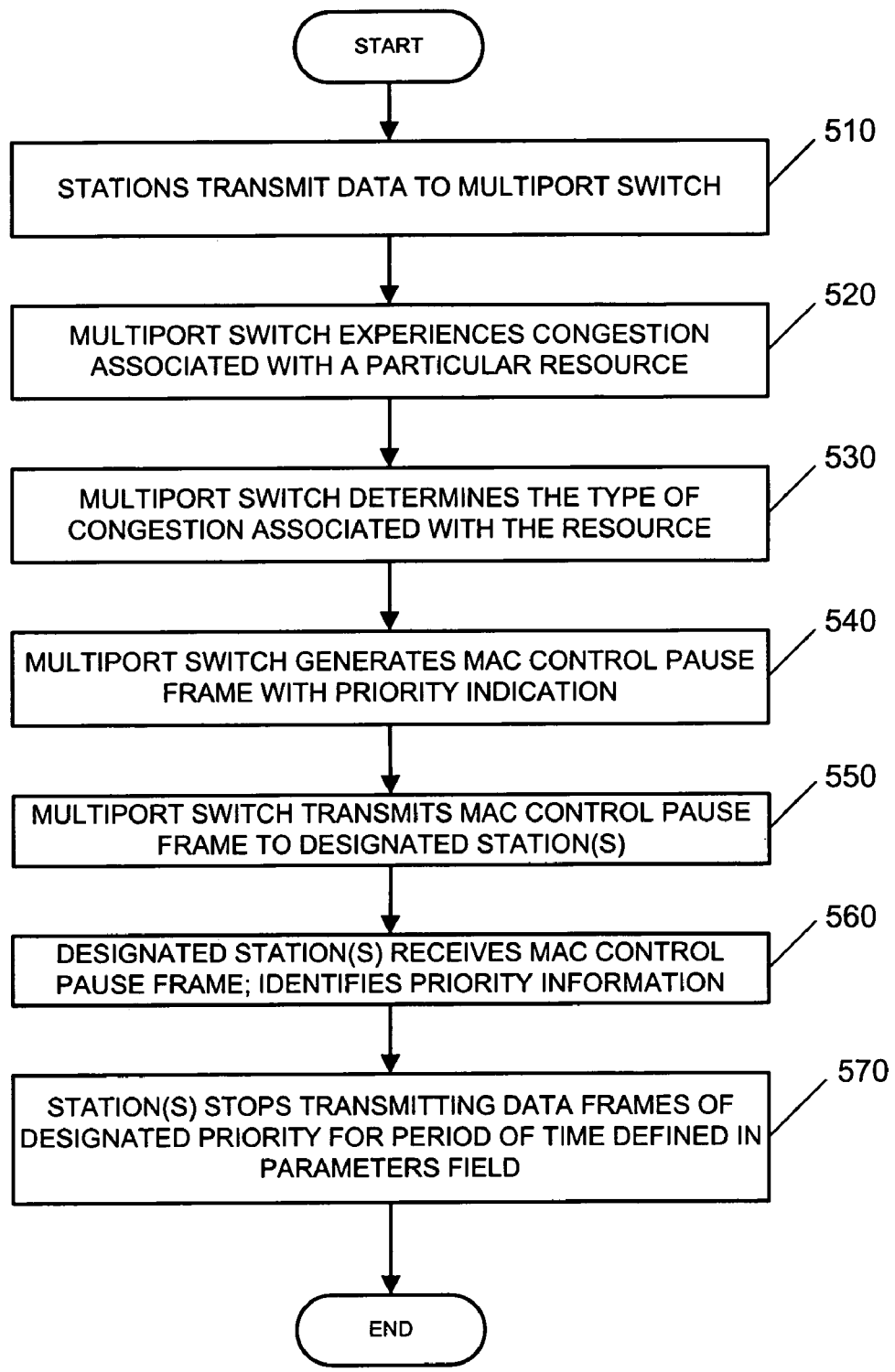
FIG. 5 is a flow diagram illustrating processing performed by the multiport switch of FIG. 1, according to an exemplary implementation consistent with the present invention.

FIG. 5 illustrates exemplary processing for generating and transmitting a MAC control pause frame, consistent with the present invention. Processing begins upon start-up of multiport switch 180. Assume that each of the network stations 110 and node 150 are transmitting data packets to the multiport switch 180 (step 510). Further assume that the multiport switch ISO experiences "congestion" with a resource associated with one of the network stations 110 (step 520).

For example, a port may be considered congested when one of its output queues is full, or almost full. For example, FIG. 6 illustrates the output control queues 240 (FIG. 2) of multiport switch 180 in an exemplary implementation of the present invention. Referring to FIG. 6, output control queues 240 includes a write side queue 242, a read side queue 244 and an output queue controller 246. An overflow queue (not shown) may also be included in the external memory 170. Both the write side queue 242 and the read side queue 244 include individual queues associated with each particular port supported by the multiport switch 180. Each queue associated with each respective port may be further subdivided into a low priority queue and a high priority queue, as illustrated in FIG. 6. The high and low priority queues, respectively, store frame forwarding information associated with high and low priority frames received by the multiport switch 180. A high priority frame may include a frame that requires lower access latency, such as a frame destined for a management device or a frame for a multimedia application. In alternative embodiments, each queue associated with each port may include additional queues associated with frames having different levels of priority. For example, a queue may include three or more individual queues representing three or more levels of priority.

The output queue controller 246 monitors the write side and read side queues. Each of the output queues may be sized according to the bandwidth of the port it services. For example, the output queue associated with a 1 Gb/s station may be larger than the output queue associated with a 100 Mb/s station. An output queue may be considered congested when the queue is full. Alternatively, the output queue may be considered congested when the queue is nearly full.

In any event, when a resource on the multiport switch 180 becomes congested, the multiport switch 180 identifies the type of congestion associated with the particular resource (step 530). For example, referring to FIG. 6, the output queue controller 246 may identify the particular queue in which the congestion exists. That is, the output queue controller 246 may identify the particular port and priority associated with the congestion. For example, assume that the low priority output queue on the write side 242 associated with port 2 is full. In this situation, the output queue controller 246 may identify the low priority queue associated with port 2 as congested.

The multiport switch 180 may then generate a MAC control pause frame with a priority indication, such as MAC control pause frame 400 (step 540). The multiport switch 180 may then transmit the MAC control pause frame 400 to the particular station(s) identified by the DA (step 550). The DA may be set to a multicast address to include all of the stations coupled to the multiport switch 180 or a portion of the stations coupled to the multiport switch 180. Alternatively, the multiport switch 180 may wait for another data frame destined for the congested resource to be received. In this case, the multiport switch 180 may transmit the MAC control pause frame 400 to the station that transmitted the data frame to the already congested resource.

The receiving station(s) receives the MAC control pause frame 400 and determines that the frame is a control pause frame (step 560). The receiving station(s) further determines that the MAC control pause frame 400 includes priority information. It should be noted that the stations coupled to the multiport switch 180, such as network stations 110 and network node 150, may be configured to recognize two types of MAC control pause frames. For example, the stations may recognize standard MAC control pause frames, such as frame 300, and modified MAC control pause frame, such as frame 400.

The multiport switch 180 and the individual stations may coordinate the use of the modified MAC control pause frame 400 using the Auto-Negotiation feature defined in the IEEE 802.3 standard. For example, the multiport switch 180 may use the Next Page function, defined in the Auto-Negotiation protocol, to transmit a message to each of the connected stations indicating that a priority field may be included in the MAC control pause frame. The Next Page function may also be used to identify the particular values associated with the various priority levels of the data frames. In this manner, the stations receiving the modified MAC control pause frame 400 will be aware of the particular details involving the priority field 410. Alternatively, other conventional communication mechanisms may be used to ensure that the multiport switch 180 and connected stations are able to adequately communicate and identify the priority information associated with the pause frame.

The receiving station(s), consistent with an exemplary implementation of the present invention, identifies the particular type of data frames to stop transmitting, based on priority field 410 (step 560). For example, priority field 410 may indicate that the receiving station is to suspend transmitting low priority frames. In this case, the receiving station(s) stops transmitting low priority data frames for a period of time defined in the parameters field of MAC control pause frame 400 (step 570). The receiving station, however, continues to send high priority frames to the multiport switch 180. In this manner, adding a priority field advantageously enables the present invention to maintain high data throughput even when one type of congestion occurs. Additionally, when congestion associated with a low priority resource occurs, the multiport switch 180 may continue to receive high priority frames that may be more important to the overall operation of the network.

In some embodiments of the present invention, the priority field 410 may indicate that the receiving station should stop transmitting low priority frames destined for a specific port, such as port 2 in the example described above. In this scenario, the receiving station suspends transmission of low priority frames destined for port 2 for a period of time defined by the pause time in the parameters field. The receiving station, however, may continue to send high priority frames destined for port 2, as well as low and high priority frames destined for other ports. This may further increase data throughput as compared to conventional systems.

In another embodiment of the present invention, the multiport switch 180 may receive data frames having a priority indication. For example, an Ethernet frame may include a three-bit field representing one of eight levels of priority. In this case, priority mapping logic on multiport switch 180 may map the eight possible levels of priority to the number of priority levels supported by the multiport switch 180. For example, the eight levels of priority may be mapped to either high or low priority on the multiport switch. Alternatively, the eight levels of priority associated with received data frames may be mapped to three or more levels of priority on the multiport switch 180.

In any event, after the received frames are mapped to the desired priority level, the processing continues as described above in relation to FIG. 5. That is, when a congestion condition is detected, the multiport switch 180 identifies the priority associated with the congestion and transmits a pause frame including the priority indication.

In the manner described above, a multiport switch 180 may selectively request suspension of data traffic of a certain priority. This enables the present invention to continue receiving data frames of other priorities while the congestion clears. The present invention has been described with the example of an output queue resource having high and low priorities. The present invention may be used with other resources on the multiport switch in which priorities are differentiated. For example, an output queue(s) associated with transmitter 210 (FIG. 2) may include high and low priority queues. In addition an input queue(s) associated with receiver 205 (FIG. 2) may include high and low priority queues. In this case, a device coupled to the input ports may be used to determine the type of data frames received by the multiport switch 180 and store these input frames in the appropriate queue. When either a high or low priority input queue becomes congested, the multiport switch 180 may identify the priority associated with the congestion and generate a MAC control pause frame 400 including the identified priority in priority field 410.

Similarly, an input queue for the IRC 245 may include individual queues for each port that may be divided into high and low priority queues. These queues may store a portion of each of the received data frames. When a particular queue becomes congested, the multiport switch 180 may identify the priority associated with the congestion and generate a MAC control pause frame 400 that includes the identified priority in priority field 410.

Any other resource associated with multiport switch 180 in which various priorities are differentiated and which may become congested may be used in a similar manner. That is, the multiport switch 180 identifies the particular priority associated with the congestion and includes this priority information in priority field 410.

Described has been an apparatus and method for providing flow control in a network switch. One advantage of the present invention is that it enables the multiport switch 180 to selectively request suspension of data transmission of a certain type. This results in increased data throughput since frames of other priorities are not affected. Another advantage of the invention is that it may be used with any resource having multiple priority levels that may become congested, thereby increasing the usefulness of the invention.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described with the example of a multiport switch 180 transmitting a pause frame to connected stations, such as network stations 110. The present invention is also applicable to situations where a connected station, such as network station 110, may transmit a pause frame to the multiport switch 180 or to another network station 110.

Further, the examples described above refer mainly to high and low priority frames. The present invention may also be used for frames having any number of priority levels. Additionally, the present invention has been described as modifying a conventional MAC control pause frame 300 to include a priority field. In other implementations, a separate message may be transmitted after a conventional MAC control pause frame 300 to include the priority information. In this manner, the network stations 110 may be configured to wait for a second message containing the priority information to determine what type of data transmissions to suspend.

Lastly, the present invention has been described with the example of a single multiport switch 180 identifying a congestion condition and transmitting a pause frame. The present invention may also be used in situations where a number of multiport switches 180 are cascaded together to form a single network device. For example, a number of devices similar to multiport switch 180 may be components located on the same multiport device or on the same circuit board. In this case, each component may transmit and receive pause frames with a priority indication.

What is claimed is:

1. A network device configured to control communication of data frames between stations, comprising:
   a logic device configured to detect a condition associated with a resource on the network device, wherein the condition relates to a congestion condition;
   a frame generating device configured to generate a pause frame requesting suspension of data traffic in response to the detection of the condition, the pause frame including a priority indicator identifying a first priority; and
   a transmit device configured to transmit the pause frame to at least one station, the pause frame requesting the at least one station to suspend transmission of data frames corresponding to the first priority to the network device, wherein the pause frame does not affect transmission of data frames corresponding to a priority other than the first priority.

2. The network device of claim 1, wherein the priority indicator includes information representing one of a plurality of types of data frames.

3. The network device of claim 2, wherein the plurality of types of data frames includes high priority frames and low priority frames.

4. The network device of claim 1, further comprising:
   a plurality of queues for storing frame forwarding information, the plurality of queues having different levels of priority; and
   a priority detection device configured to:
      identify a priority associated with a data frame received by the network device, and
      store frame forwarding information associated with the data frame in one of a plurality of queues based on the identified priority.

5. The network device of claim 4, the logic device being further configured to detect the condition when frame forwarding information associated with a predetermined number of data frames having the first priority are stored in a first one of the plurality of queues.

6. The network device of claim 1, wherein the condition relates to a congestion condition associated with data frames having the first priority.

7. The network device of claim 1, wherein the condition relates to a congestion condition occurring when a predetermined number of data frames having the first priority are stored in at least one of an input queue and an output queue associated with a first port of the network device.

8. The network device of claim 1, wherein the condition comprises a congestion condition occurring when a portion of a predetermined number of data frames having the first priority are stored in an input queue of a device configured to generate frame forwarding information.

9. The network device of claim 1, wherein the transmit device is further configured to transmit an auto-negotiation message to the at least one station, the auto-negotiation message including information relating to the priority indicator.

10. The network device of claim 1, further comprising:
    a receive device configured to receive data frames from the stations, the data frames having a priority indicator; and
    priority mapping logic configured to convert the priority indicator received with the respective data frames to one of a number of priority levels supported by the network device.

11. In a network device that controls communication of data frames between stations, a method comprising:
    detecting a condition on the network device, wherein the condition relates to a congestion condition;
    generating a pause frame requesting suspension of data traffic of a first priority for a period of time, the pause frame not affecting data traffic of a priority other than the first priority in response to detecting the condition, the pause frame including a priority indicator identifying the first priority; and
    transmitting the pause frame to at least one station.

12. The method of claim 11, wherein the detecting a condition includes detecting a congestion condition relating to a first one of a plurality of types of data frames.

13. The method of claim 12, wherein the plurality of types of data frames includes high priority frames and low priority frames, the first priority corresponding to the first type of data frame.

14. The method of claim 11, wherein the detecting a condition includes detecting when frame forwarding information for a predetermined number of frames are stored in a queue on the network device, the method further comprising:
    identifying a priority associated with the queue, the priority corresponding to the first priority.

15. The method of claim 11, wherein the detecting a condition includes detecting a congestion condition associated with at least one of an input queue and an output queue on the network device.

16. The method of claim 11, wherein the detecting a condition includes detecting a congestion condition associated with data frames having the first priority.

17. The method of claim 16, wherein the at least one station stops transmitting data frames having the first priority for a period of time after receiving the pause frame and continues transmitting data frames having a priority other than the first priority.

18. The method of claim 11, further comprising:
    transmitting an auto-negotiation message to the at least one station prior to transmitting the pause frame, the auto-negotiation message including information relating to the priority indicator.

19. The method of claim 11, further comprising:
    receiving a data frame including a priority indicator; and
    mapping the priority indicator received with the data frame to one of a number of priority levels supported by the network device.

20. A computer-readable medium having a data structure comprising:
- a source address field;
- a destination address field;
- a priority field including information representing a priority level associated with data frames for which data transmissions are to be suspended; and
- a pause time field including information representing a length of time for at least one receiving station identified by the destination address field to suspend data transmissions relating to the priority level in the priority field.

21. A data communication system, comprising:
a first device configured to:
- receive data frames from at least one station,
- determine a priority associated with the received data frames,
- detect a congestion condition when at least a predetermined number of data frames of a first priority are being processed by the first device,
- generate a pause frame requesting suspension of data transmissions in response to the congestion condition, the pause frame including a priority indicator corresponding to the first priority, and
- transmit the pause frame to at least one station; and a second device configured to:
- receive the pause frame,
- suspend transmission of data frames relating to the first priority, and
- continue transmission of data frames relating to a second priority.

22. In a network including a number of network stations and at least one network device configured to control communication of data frames between stations, a first network device, comprising:
- a receive device configured to receive data frames from at least one of the network stations and other network devices; and
- data frame processing logic configured to:
  - identify a received data frame as a pause frame, the pause frame including a priority indicator,
  - map the priority indicator to a first priority,
  - suspend transmission of data frames corresponding to the first priority, and
  - continue transmission of data frames corresponding to priorities other than the first priority.

* * * * *